United States Patent [19]
Johansson

[11] Patent Number: 5,173,252
[45] Date of Patent: Dec. 22, 1992

[54] REMOVABLE SPRINGS FOR FERRULE SPACER

[75] Inventor: Eric B. Johansson, Wrightsville Beach, N.C.

[73] Assignee: General Electric Company, San Jose, Calif.

[21] Appl. No.: 702,643

[22] Filed: May 17, 1991

[51] Int. Cl.$^5$ .............................................. G21C 3/32
[52] U.S. Cl. ..................... 376/448; 376/441; 376/442; 376/446
[58] Field of Search ............. 376/448, 441, 438, 446, 376/442; 976/DIG. 73, DIG. 80; 29/173

[56] References Cited
U.S. PATENT DOCUMENTS

| | | | |
|---|---|---|---|
| 3,890,196 | 6/1975 | Chetter | 376/441 |
| 4,544,522 | 10/1985 | Curulla et al. | 376/441 |
| 5,069,864 | 12/1991 | Johansson | 376/441 |

*Primary Examiner*—Donald P. Walsh
*Assistant Examiner*—Meena Chelliah
*Attorney, Agent, or Firm*—Robert R. Schroeder

[57] ABSTRACT

In a fuel bundle having a matrix of parallel side-by-side fuel rods supported between a lower tie plate and an upper tie plate, a new ferrule and spring construction for the required spacers used to maintain the fuel rods in their required precise side-by-side alignment is disclosed. Paired ferrules are each provided with apertures for capturing a single spring between the ferrules. The springs are provided with a continuously looping main body having protruding tabs on opposite sides of the springs. The paired ferrules are confronted at their respective apertures for the capture of the springs. The shape of the apertures permits insertion of the spring after the ferrules have been welded together. The springs are compressed while being inserted. After insertion the springs return to their original shape and are confined between the ferrules. After insertion of the fuel rods, the springs are compressed to an intermediate position, but are still confined within the ferrule apertures. The springs can be partially inserted into the ferrules and held in a compressed condition while the fuel rods are inserted. This reduces the forces on the fuel rods and reduces scratching of the fuel rods during bundle assembly. After the fuel rods are inserted, the springs are fully inserted.

24 Claims, 5 Drawing Sheets

REMOVABLE SPRINGS FOR FERRULE SPACER

BACKGROUND OF THE INVENTION

This invention relates to spacers for use in nuclear fuel bundles, the spacers maintaining individual fuel rods or tubes containing fissionable materials in their designed spaced apart relation. More particularly, a spacer is disclosed which has a spring that can be placed within and removed from the previously assembled spacer. Further, provision is made for the insertion of fuel rods through the spacers of a fuel bundle with the spring of the spacer in the compressed, partially inserted state for avoiding scratching of inserted fuel rods on fuel bundle assembly.

SUMMARY OF THE PRIOR ART

Modern boiling water nuclear reactors include a core composed of many discrete fuel bundles. Water circulates from the bottom of each fuel bundle, is heated in passing upward through each fuel bundle, and passes out the top of each fuel bundle in the form of heated water and steam.

The fuel bundles are composed of discrete groups of fuel rods—sealed tubes which contain nuclear fuel. Typically, the fuel rods are supported upon a lower tie plate and held in side-by-side vertical relation by an upper tie plate. Water flow is confined within a fuel bundle channel extending from the lower tie plate to the upper tie plate. In addition to supporting the fuel rods, the lower tie plate admits water into the interior of the fuel bundle. The upper tie plate—in addition to maintaining the fuel rods upright—permits the heated water and generated steam to exit the fuel bundle.

The fuel bundles are typically about 160 inches in length. Consequently, the individual fuel rods within the fuel bundles are flexible along the length of the fuel bundle. If unsupported, the individual fuel rods could easily move out of their intended side-by-side spacing responsive to the forces of flow induced vibration and metallic creep. The reader will understand that metallic creep is a well known phenomenon resulting from both pressure and radiation within the reactor.

Preservation of the intended side-by-side spacing of fuel rods within a fuel bundle is important. Specifically, if the fuel rods are not maintained within their desired side-by-side spacing, the designed nuclear reaction and concurrent heat generation with steam production does not occur efficiently.

To maintain the required spacing between the individual fuel rods and to prevent unwanted vibration, it has long been the practice of the nuclear industry to incorporate spacers along the length of the fuel bundles. Typically, anywhere from five to ten spacers—usually seven—are placed within the each fuel bundle. The spacers are preferably placed at varying elevations along the length of the fuel bundle to brace the contained fuel rods in their designed location.

Design considerations of such fuel rod spacers are well known. They include retention of rod-to-rod spacing; retention of fuel assembly shape; allowance for fuel rod thermal expansion; restriction of fuel rod vibration; ease of fuel bundle assembly; minimization of contact areas between the spacer and fuel rods; maintenance of structural integrity of the spacer under normal and abnormal (such as seismic) loads; minimization of reactor coolant flow distortion and restriction; maximization of thermal limits; minimization of parasitic neutron absorption; and minimization of manufacturing costs including adaption to automated production.

Spacer construction is easily understood. Each spacer has the task of maintaining the precise designed spacing of the particular matrix of fuel rods at the spacer's elevation within a fuel bundle. It has been a common practice to provide each spacer with a matrix of ferrules for surrounding each fuel rod of the matrix of fuel rods. Each ferrule is provided with at least one stop. The fuel rods when biased into the stop(s) of their ferrules have their precise designed side-by-side spacing preserved.

The necessary biasing of the fuel rods within the spacers has been accomplished by individual springs. In the prior art it has been a common practice to have two side-by-side ferrules share the same spring at a common aperture defined between the ferrules. Typically the shared spring is of the loop configuration having two spring legs joined together at the top and at the bottom to form a continuous and elongated loop spring. One spring leg protrudes through the common aperture into a first ferrule of a ferrule pair and biases the fuel rod in the ferrule against the stops of the first ferrule of the ferrule pair. The other spring leg protrudes through the common aperture into the other ferrule of the ferrule pair and biases the other fuel rod in the second ferrule against the stops of the second ferrule of the ferrule pair.

Maintaining the loop springs of the prior art within the side-by-side ferrule pairs has been difficult. The common aperture between adjacent ferrules has been defined by configuring an aperture in each ferrule and confronting the ferrules at these defined apertures. The confronted apertures define the common aperture. These confronted apertures have been configured with irregular shapes having protruding internal surfaces—for example apertures of the "E" variety have been used. By the expedient of either overlapping or confronting protruding portions of the confronted apertures between the loops of the prior art springs, capture of the springs into the common aperture between the spacers has resulted. With the loop springs confined in the common aperture between the metal walls of a ferrule pair, the required spring biasing in two ferrules requires only a single confined loop spring.

Unfortunately, modern fuel bundle design has complicated the design of spacers and spacer springs. Fuel bundles are now more densely packed with smaller diameter fuel rods. As a consequence, the space available for both spring movement and capture of the spring to the spacer is vastly reduced.

As fuel bundles become more dense, the number of springs required across a spacer has increased. Unfortunately, the required movement of the springs in either maintaining the fuel rods in alignment or permitting assembly of the fuel bundle in the first instance has remained unchanged. The practical effect of having denser fuel bundles is the need to redesign the springs within fuel bundle spacers.

The assembly of fuel bundles has further complicated this problem. Specifically, the biasing springs of individual spacers have a tendency to scratch fuel rods when fuel rods are inserted into the spacers. These scratches can be the location where corrosion of the fuel rods starts during their in-service life. This being the case, it has been desirable to encase fuel rods in protective plastic sheaths during their insertion into the spacers. Once insertion is complete, the plastic sheaths are removed.

The use of the plastic sheaths can prevent scratches. Unfortunately, the same plastic sheaths require additional spring flexure during fuel bundle assembly. This additional flexure is necessary to permit the plastic protective coating to be temporarily inserted along with the fuel rods into the fuel bundle. In some fuel bundles requiring the use of these plastic sheaths, the existing spring flexure is not within design tolerance when two plastic covered fuel rods are placed simultaneously within the ferrules of a ferrule pair.

As a consequence, construction of some fuel bundles requires a complex procedure for inserting the fuel rod. Given a ferrule pair and spring, a first fuel rod with a plastic sheath is inserted into one ferrule of the pair, and the sheath is removed. Then a second fuel rod with a plastic sheath is inserted into the remaining ferrule and its sheath is removed. This procedure is required because the prior art springs cannot deflect far enough to accommodate both fuel rods and both plastic sheaths simultaneously. If this alternating insertion procedure must be followed over a 9 by 9, 10 by 10, 11 by 11 or 12 by 12 matrix in a carefully controlled sequence, it can be understood that a spring design which permits the elimination of these plastic sheaths without increasing the risk of undesirable scratches is desirable.

The springs of the prior art are also difficult to replace if they become damaged. Replacing known springs requires that the ferrule pair be cut apart, along with the damaged spring. Then a new ferrule pair with a spring must be inserted and the ferrules rewelded. A spring design which could be more easily replaced would be a substantial improvement.

Finally, those familiar with mechanical design and mechanical design tolerances will realize that exact dimensions and perfect alignment are never achieved. Instead, a tolerance range is specified. The cost of manufacture increases as the tolerance range is narrowed. In prior art spacers, and to a greater degree in new designs, a very tight tolerance range is required for the springs and ferrules. If a spring can be designed with greater flexibility, and a mounting method which allows more spring deflection, the tolerances can be less restrictive.

Because of at least the given design considerations, designing springs having improved flexibility for use in spacers has become a high priority.

A standard method for providing increased flexibility is to vary the width of the spring, using a lesser width in regions of low stress. Unfortunately, the width of the current loop spring is not easily varied. The loop spring starts out as a continuous circular loop of constant width and is then bent into its final shape. The circular loop, or the final spring could be machined to a varying width, but the cost would be high.

COPENDING PATENT APPLICATION

Not Prior Art

In my copending patent application Ser. No. 07/623,828 filed Dec. 6, 1990 entitled Self Locating Springs for Ferrule Spacer, now U.S. Pat. No. 5,078,961 issued Jan. 7, 1992, I set forth an improved spring construction which is self centering with respect to confronted ferrules.

In this invention, a ferrule spacer is disclosed with each of the discrete ferrules surrounding a fuel rod within the fuel rod matrix. Ferrule pairs are used for capturing a spring between the ferrules. Each ferrule defines an aperture for confrontation with the corresponding aperture in the adjacent ferrule of the ferrule pair.

The ferrules at their respective ferrules define two types of apertures. A common aperture opening to the center of each of the ferrules is defined for the capture of the spring between the ferrules. Paired side apertures opening to the outside of each of the ferrules are defined. It is into these paired side areas that portions of the springs protrude to cause the self centering feature of this disclosure.

Loop springs are used in this disclosure. One portion of the loop protrudes into one ferrule for biasing one fuel rod passing through that ferrule. Another portion of the loop protrudes into the other ferrule for biasing another fuel rod passing though that ferrule.

The loops springs have tabs. These tabs protrude out of the paired side apertures. These tabs in combination with the side apertures cause the centering feature of the springs.

SUMMARY OF THE INVENTION

In the present disclosure, the prior art practice of having two side-by-side ferrules share the same biasing spring for two adjacent fuel rods is followed. Consequently, paired ferrules are each provided with apertures for capturing a single spring between the ferrules. The springs are provided with a continuously looping main body having protruding tabs on opposite sides of the springs.

The paired ferrules are confronted at their respective apertures for the capture of the springs at their main body and to provide defined side apertures between the confronted apertures for permitting protrusion of spring tabs for holding and centering the springs within the confronted apertures.

Modification of the confronted apertures occurs to permit insertion of the spring in a compressed disposition from the side of the ferrules. Once the spring is inserted fully between the ferrules it expands. And once the spring expands, it is captured.

As a consequence, spacer construction can be substantially completed prior to the insertion of the springs.

In the construction of the disclosed spacer, at least two ferrules are welded together to form the confronted apertures and side apertures between the ferrule pair. After the ferrules have been welded together, a spring is compressed with a tool, such as a needle-nosed pliers, inserted vertically into the interstitial space formed by the two ferrules, and then moved horizontally into the central aperture between two ferrules. After the spring is fully inserted it springs open and is captured in the slots between the two ferrules.

The spring herein consists of two identical halves which are welded together. The manufacture of the spring begins with flat strip material. A punching operation provides the variation in width required for optimum spring design and provides the locating tabs. The tab portions are included at either end of the spring, are used for entrapping the springs within their respective ferrule apertures, and are incorporated into the spring legs to produce a spring having longer spring legs with a resulting lesser range of spring force over the designed range of spring deflection.

OTHER OBJECTS, FEATURES AND ADVANTAGES

An object of this invention is to mount a loop type spring between a ferrule pair in a spacer assembly without having the material of the ferrules intrude within the loop of the spring. According to this aspect of the invention, paired ferrules are provided with confronting apertures. These apertures when confronted provide two functions. First, they trap between the ferrules the main body of the loop type spring. Second, they provide confining slots defined between the respective ferrule pairs. To mate with these confining slots, tabs protrude from the main body of the loop springs on either side of the loop springs. The tabs extend from the trapped main body of the loop spring within the confronted apertures into the confining slots. As a result, the loop springs are held to the confronted apertures of the ferrule pair by the tabs.

An advantage of the disclosed spring is that it is self centering with respect to the ferrule pair. Under the forces of compression exerted on the fuel rods, the spring seeks and maintains its designed position with respect to the ferrule pair.

An additional advantage of the disclosed spring design is that the material of the ferrules is no longer required to penetrate in between the discrete legs of the loop springs. This being the case, the spring legs are permitted a relatively greater movement—this compression permitting movement of each leg toward the remaining leg until contact of one spring leg with its opposed spring leg occurs. No longer is spring leg movement limited by the structure of portions of the ferrules invading the interstitial space between the discrete spring legs of the loop spring.

A further advantage of the disclosed spring and ferrule construction is that assembly of the spacers is simplified. In the past the loop springs have had to be individually threaded to portions of the ferrules and thereafter trapped in place by manipulation of the confronting ferrules. With the design here disclosed, simple trapping of the spring between confronted ferrules is all that is required.

An additional advantage of the spring construction here disclosed is that the spring can be partially inserted into the ferrule apertures, allowing fuel rods to be inserted through the ferrules without contacting the springs. This eliminates the need to use plastic sheaths to protect fuel rods as they are inserted.

An additional object of this invention is that the spring can be inserted into and removed from the ferrules after the ferrules and their bands are welded together to form the spacer unit. As no disassembly of the spacer unit is necessary to remove a defective or failed spring, repair and replacement of springs and/or fuel rods is greatly simplified.

DETAILED DESCRIPTION OF THE PREFERRED EMBODIMENT

Figure 1A:
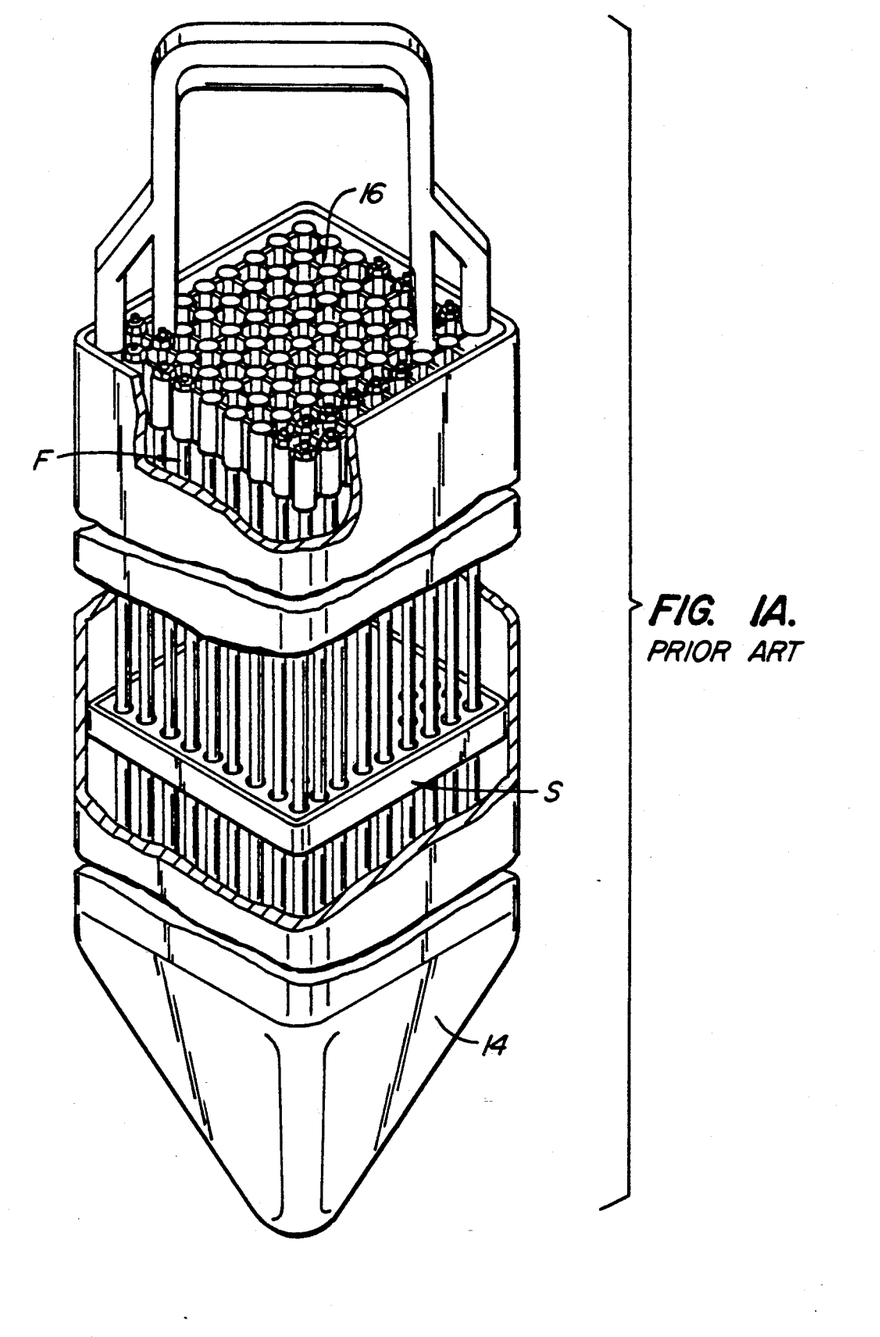
FIG. 1A is a perspective view of a broken away fuel bundle having contained side-by-side fuel rods illustrating a bottom tie plate for the support of fuel rods and the inflow of coolant, a top tie plate for maintaining individual fuel rods in side-by-side vertical upstanding relation and permitting the outflow of heated coolant, and a typical spacer positioned therebetween for maintaining the fuel rods in their designed spaced apart relation.

Referring to FIG. 1A, a typical prior art fuel bundle is illustrated in perspective with the major sections between the top and bottom of the bundle removed. The fuel bundle has a lower tie plate 14, an upper tie plate 16, and a plurality of fuel rods F. Fuel rods F extend vertically the length of the fuel bundle from a position of support on lower tie plate 14 to the upper tie plate 16.

Unlike the illustration here shown, the fuel bundle is elongated. Typically, it is in the order of 160 inches long with approximately a 5"×5" cross-section. The fuel rods within the bundle assembly are flexible in the longitudinal direction.

A 9×9 array of fuel rods is illustrated. Arrays of 10×10, 11×11, and 12×12 are known. It goes without saying that as the arrays become more dense, fuel rod diameter decreases and longitudinal flexibility increases.

Figure 1B:
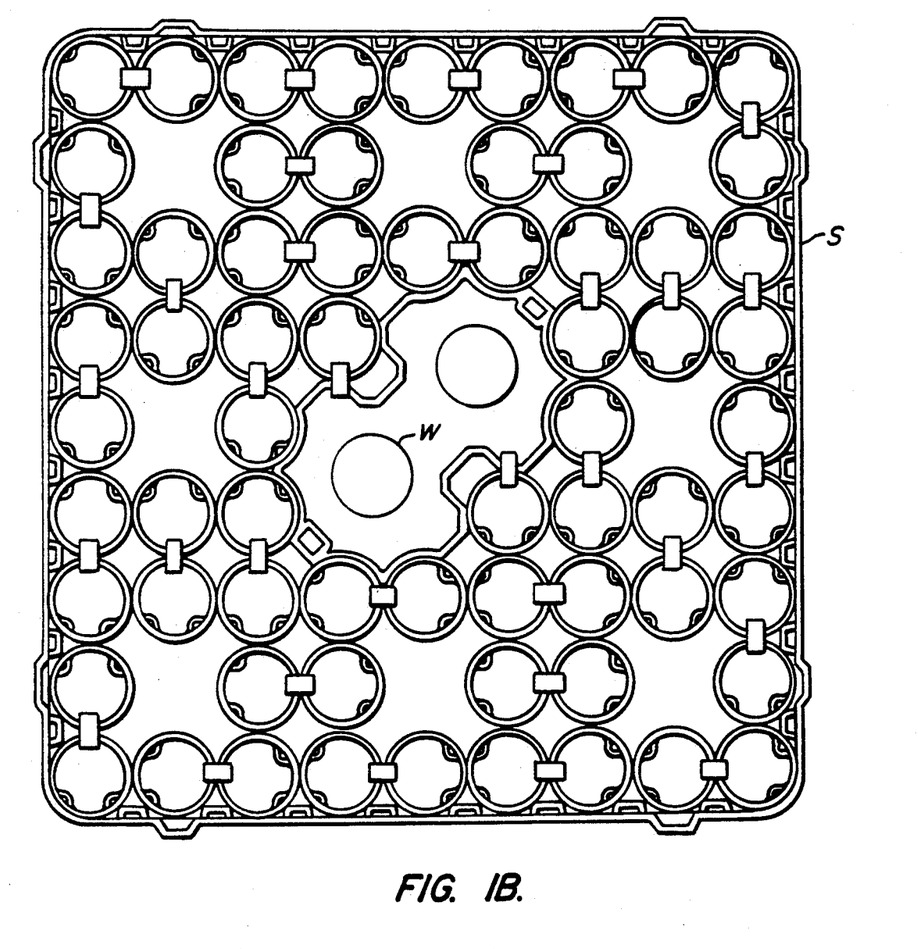
FIG. 1B is a top plan view of a spacer utilizing this invention in which the discrete spacer cells can be each individually viewed.

Referring to FIG. 1B, an entire spacer is shown having a 9 by 9 matrix. The particular spacer illustrated here is provided with a central aperture for a large water rod. It is the construction of such a spacer to which this invention is directed. In particular, this invention allows the entire spacer of FIG. 1B to be constructed before the insertion of any of the springs between the ferrules.

Fuel rods F are constructed by placing fuel pellets within tubular metallic cladding. The metallic cladding is thereafter sealed at both ends, making the fuel rods sealed pressure vessels.

During fission, the spacing between discrete fuel rods F is important for efficiency of the nuclear reaction as well as the generation of steam. Furthermore, any vibration on the fuel rods F is undesirable as such vibration can induce either rod abrading or cracking with resultant leakage of the radioactive materials within the fuel rods. To assure the proper spacing of the rods and to prevent them from vibrating, a plurality of spacers S are placed along the length of the fuel bundle F. Typically, 5 to 10 such spacers are utilized with 7 spacers being common. The spacers are placed at individual preselected elevations along the length of the fuel bundle.

As shown in FIG. 1B, each spacer S consists of a grid of ferrules.

The ferrules which make up spacer S in FIG. 1B are described in commonly-owned, co-pending patent application Ser. No. 07/623,828, entitled "Removable Springs for Ferrule Spacer" filed Dec. 6, 1990, now U.S. Pat. No. 5,078,961 issued Jan. 7, 1992. That specification is incorporated herein for all purposes. As an understanding of the construction and operation of the ferrules and springs described therein is necessary for an understanding of this invention, the following description relates to the ferrules described in that application. Accordingly, it what follows, FIGS. 2A, 2B, 3, 4, and 5 will describe the ferrule spacer of that disclosure.

Figures 2A, 2B, 3, 4, 5:
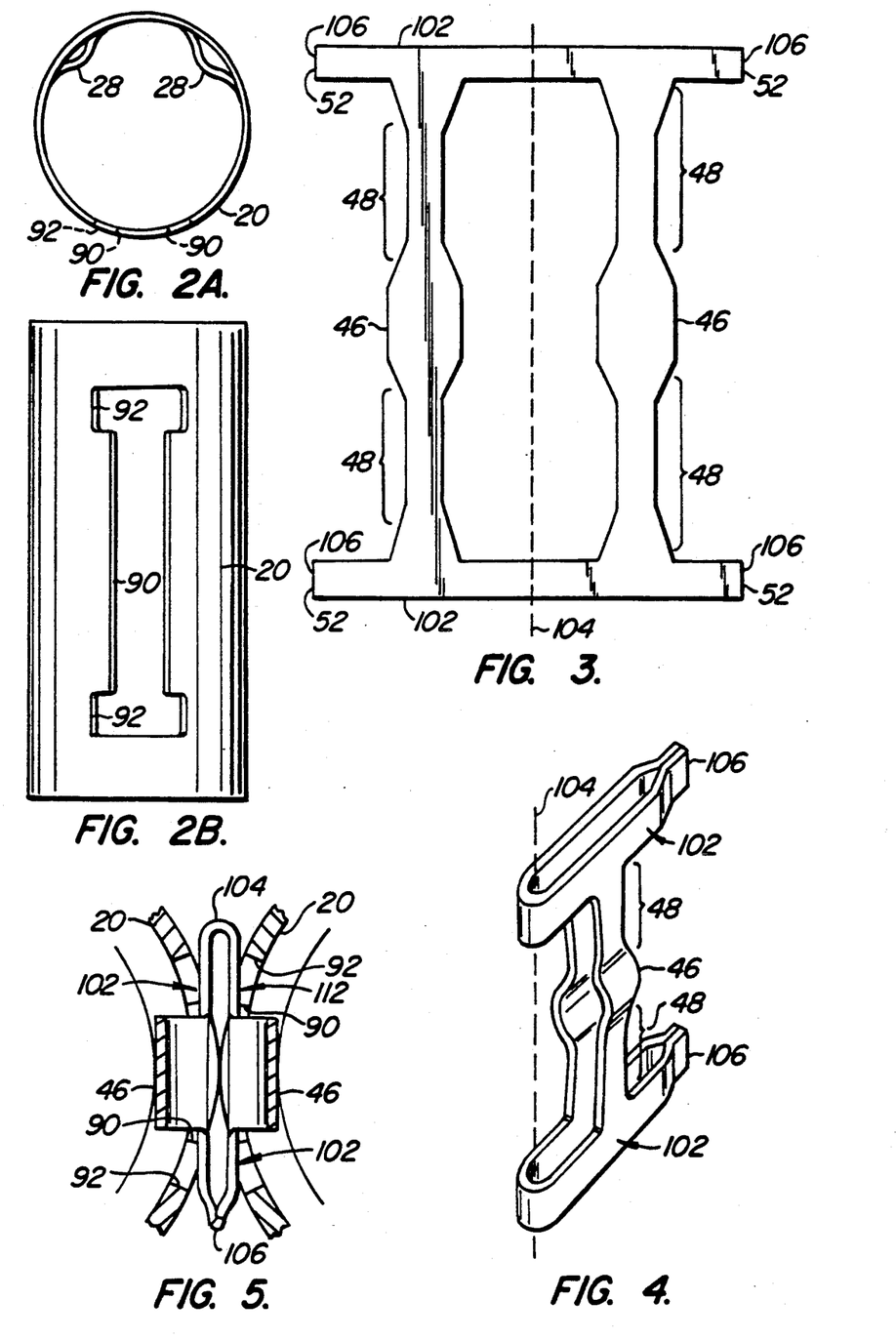
FIGS. 2A and 2B are respective plan and side elevations of a ferrule construction with the ferrule having an "I" profile aperture.
FIG. 3 is a plan view of spring material before formation into a loop spring.
FIG. 4 is a perspective view of a loop spring formed from the spring material of FIG. 3.
FIG. 5 is a cross section at the mid-height of the loop spring of FIG. 4 showing how the spring is located between two adjacent ferrules.

Referring to FIGS. 2A and 2B, a ferrule 20 has an "I" shaped aperture 90. Aperture 90 includes upper and lower rectangular sections 92 which sections form the respective upper and lower bars of the "I" section of the aperture 90. Respective stops 28 form the points against which fuel rods are biased.

Fabrication of the spring can be easily understood. Spring metal, typically formed of Inconel, is stamped in the shape shown in FIG. 3. The spring includes upper and lower bars 102 with spring legs 48 and rod contacting portions 46 formed therebetween. This spring is bent about axis 104.

Referring to FIG. 4, the respective portions of the spring have been bent about axis 104, and the ends 106 are welded together. Such bending causes upper and lower bars 102 to bend in loop configuration back upon themselves. These members are integral with spring legs 48 and expand the effective length of the spring. The rod contacting portions 46 contact the rods, holding them in place against stops 28 (FIG. 2A). Such a spring with an expanded effective length enables compression at the rod contacting portions 46 to occur without appreciable change in the force required for the compression. Such springs with an expanded effective length can be referred to as "softer" springs.

Trapping of the spring into apertures 90 and 92 is shown in FIG. 5. Apertures 90 capture the main spring body. Apertures 92 both above and below aperture 90 capture arms 102. Since arms 102 are a part of the spring, these arms are required to extend into the tab receiving slots 112 defined by confronted aperture portions 92 in each of the ferrules.

To construct the spacer, ferrules 20 are confronted with the spring shown in FIG. 4 trapped therebetween. When the ferrules are brought together and fastened together, self-centering trapping of the spring occurs.

In the description that follows, the present disclosure will be set forth. Over my prior disclosure, it will be understood that spring insertion from the side can now occur. This has the advantage of allowing substantially complete assembly of the spacer before spring insertion, permitting the removal of damaged springs without spacer disassembly, and finally enabling partial spring insertion to compress the spring and yet maintain the spring out of the path of inserted fuel rods so that spring scratching of inserted fuel rods can be avoided upon fuel bundle assembly.

Figure 6A:
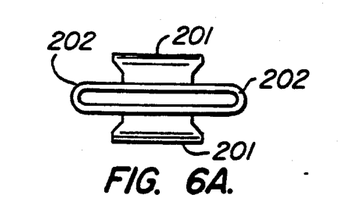
FIG. 6A, 6B and 6C are respective top plan, front elevation and side elevation of a spring formed according to a first embodiment of the present invention.
Figure 6B:
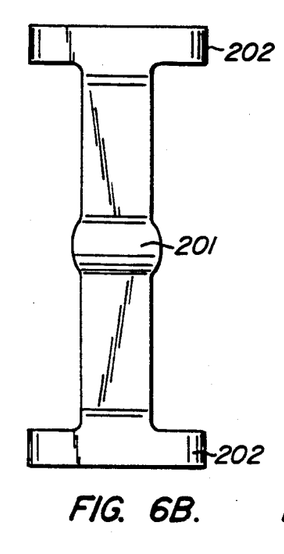
Figure 6C:
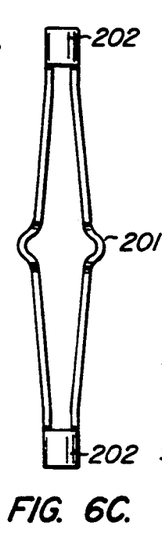
Figure 7:
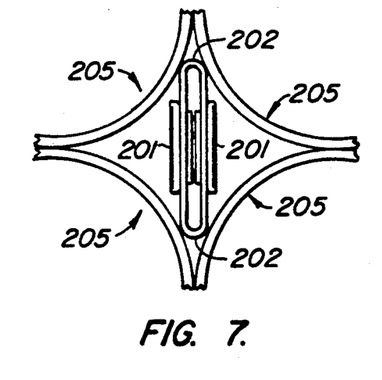
FIG. 7 is a top plan of four ferrules with a spring inserted into the interstitial region.

Spring 200, fabricated according to the present invention, is illustrated in FIGS. 6A, 6B and 6C. Spring 200 is fabricated from sheet material of a known alloy, typically Inconel. After stamping, the spring blank is folded about a vertical axis and welded together. As shown in FIG. 6A, upper and lower loops 202 have semi-circular arcs at both ends.

Figure 8A:
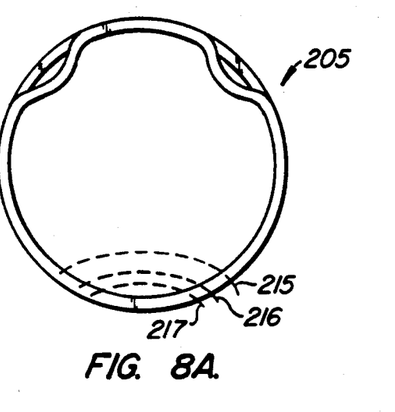
FIGS. 8A and 8B are top plan and front elevations of a ferrule with an aperture according to a first embodiment of the present invention.
Figure 8B:
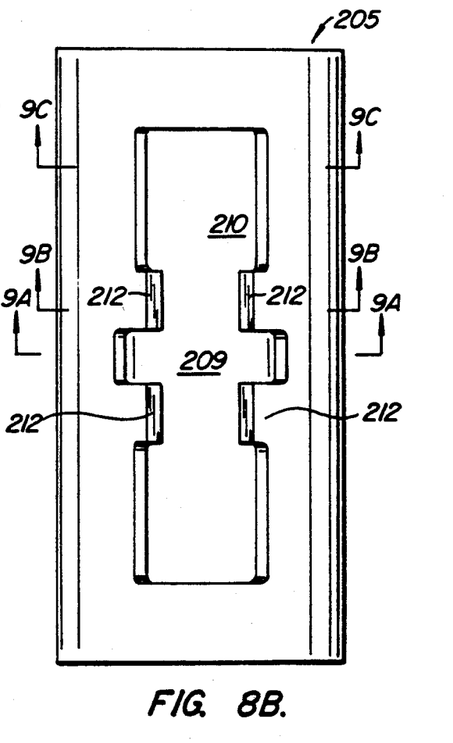

Ferrule 205, illustrated in FIGS. 8A and 8B, functions with spring 200 to hold the fuel rods in place. Aperture 210 is cut using circular cutters of different radii, the cuts made by these circular cutters being illustrated in FIG. 8A by dashed lines 215, 216, and 217. Rectangular central area 209 of aperture 210 is cut deepest (furthest) into the ferrule circumference (line 215, FIG. 8A). This allows rod contacting projections 201 in spring 200 (FIG. 6C) to pass between two confronted ferrules 205. Tabs 212 above and below central area 209 prevent lateral movement of spring 200 after it has been inserted into aperture 210.

Figure 9A:
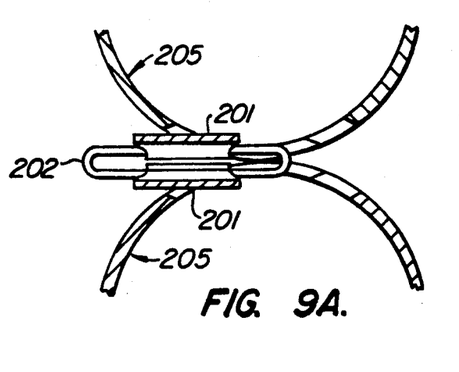
FIGS. 9A, 9B and 9C are cross-sections of the ferrule shown in FIGS. 8A and 8B taken, respectively, along lines A—A, B—B and C—C, the cross-sections showing a spring according to the present invention being inserted into the aperture in the ferrule.
Figure 9B:
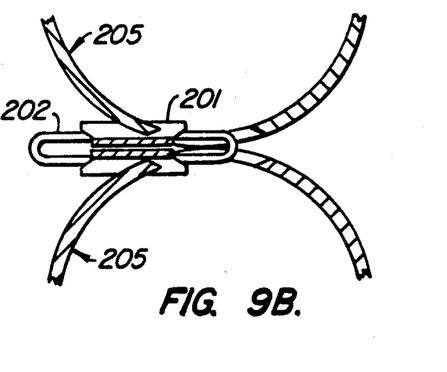
Figure 9C:
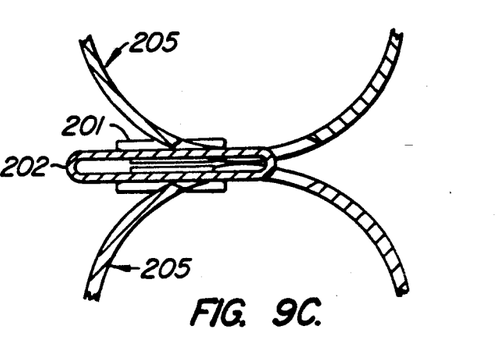

FIGS. 9A, 9B and 9C are cross-sections of a spring 200 being inserted into a ferrule 205, the cross-sections being taken, respectively, along lines A—A, B—B, and C—C in FIG. 8B. The shaded portions of the ferrule and spring in each figure show that when the spring is compressed, its insertion into aperture 210 is unobstructed by any projections near aperture 210. The figures clearly demonstrate that the different elevations of the spring will clear the ferrule slot (aperture 210) so that the spring can be inserted.

Figure 10:
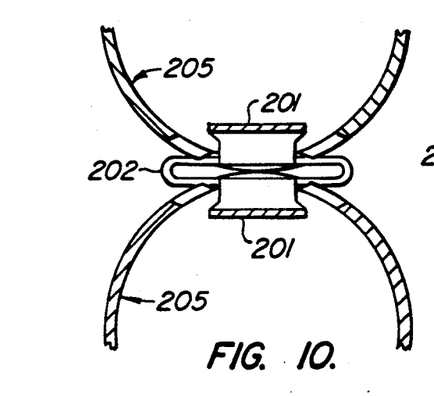
FIG. 10 shows a spring according to this invention inserted into a ferrule pair with no compressive force applied.
Figure 11:
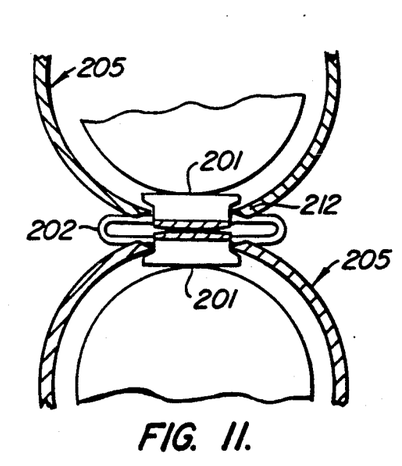
FIG. 11 shows the spring of FIG. 10 with fuel rods providing compressive force.

FIG. 10 is a cross-section taken along line A—A in FIG. 8B, showing a spring 200 inserted into ferrule 205, with no compressive force applied to spring 200. Projections 201 extend into the central area of ferrule 205. FIG. 11 shows the same spring and ferrule, with the addition of fuel rods 230. These compress the spring, which in turn forces the fuel rods against supports 235 (FIG. 8A).

Figure 12:
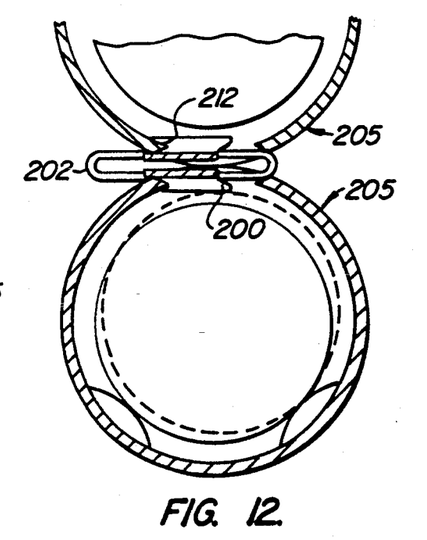
FIG. 12 illustrates the use of the present invention in a soft assembly mode of use.

FIG. 12 illustrates the use of the present invention in compressing of the partially inserted spring to prevent the scratching of fuel rods during fuel bundle assembly. Referring to FIG. 12, spring 200 has been compressed, partially inserted into aperture 210, and released. Spring 200 tries to open to its unloaded position (see FIG. 10) but is restrained by ferrule tabs 212. There is a gap between the spring and the normal position of a fuel rod.

Fuel rods can then be inserted with no spring force present, greatly reducing the number and magnitude of scratches on the fuel rods. Dashed circled 251 in FIG. 12 indicates the limit position of a fuel rod as it is being inserted. Projections 201 have been added to the spring so that the edge of spring 200 when in contact the fuel rod has a reduced tendency to cause scratches.

After the fuel bundle is completely assembled, the springs can be pushed fully into the apertures, where they will snap into position, pushing against the fuel rods, and holding them in position. The springs can be pushed inward with a tool which fits into the interstices between the ferrules. For example, a tool with a tapered end can enter the spaces between ferrules force the springs into position.

If necessary, an additional procedure can be adopted to ensure complete protection against fuel rod scratches. This procedure involves coating each spacer, along with the partially inserted springs, with a gelatin coating. After the bundle is assembled and the springs locked into place, the gelatin is then dissolved in water.

This procedure requires only minor modification to existing fuel rod assembly procedures. The spacers must be given a gelatin coating. Guides may be required to lead the fuel rods into the spacer ferrules, and to support the fuel rod weight, as the weight of the fuel rods may wear the gelatin off the stops and springs. A tool mounted on a long rod must be inserted through the interstitial space between the ferrules to nudge the springs into final position. Finally, the fuel bundles must be rinsed in water to remove the gelatin. It should be understood that the current fuel rod loading sequence, loading one row of rods at a time, starting at the bottom, need not be followed. Accordingly, automated machines having random loading sequences of the spacer matrix can be utilized.

An alternative method for accomplishing the same end as the gelatin coating utilizes a low melting point metal alloy which can be removed with hot water. The springs are compressed and dipped in the molten alloy. The alloy hardens while the spring is compressed and holds the spring in the compressed state. The springs and the fuel rods are inserted into the spacers. After the fuel rod assembly is complete, it is rinsed in hot water, melting and removing the alloy and releasing the springs to hold the fuel rods.

It will be appreciated that this disclosure will admit of modification. Any combination of a spring trapping aperture between a ferrule pair and a trapped spring capable of being inserted to the aperture of the of the ferrule pair is intended to be broadly covered in this disclosure.

It will be understood that those having skill in the art by reviewing the disclosed design can carefully dimension springs and ferrules for the insertion process taught herein. The reader is advised that dimensions must be carefully anticipated in light of the density of the fuel rod matrix and the particular ferrule spacer under consideration.

What is claimed is:

1. A spacer for use in combination with a fuel bundle, said fuel bundle having a plurality of fuel rods, a lower tie plate for supporting said plurality of fuel rods in side-by-side upstanding relation and defining a plurality of apertures for permitting water to be heated to enter said fuel bundle, an upper tie plate for maintaining the upper ends of said fuel rods in parallel side-by-side relation as supported on said lower tie plate and defining a plurality of apertures for permitting heated water and steam to escape from said fuel bundle, a channel for surrounding said fuel rods and extending from said lower tie plate toward said upper tie plate for confining said water flow around said fuel rods within said fuel bundle, and a plurality of spacers for placement within said channel between said tie plates around said fuel rods for maintaining said fuel rods in designed side-by-side spacing, the improvement to said spacer comprising:

at least first and second side-by-side ferrules forming a ferrule pair for fitting around respective side-by-side fuel rods to maintain said fuel rods spaced apart one from another;

each ferrule of said ferrule pair having at least one internal stop for permitting said fuel rod internal of said ferrule to be biased against said stop to a position of designed side-by-side alignment with respect to said fuel bundle at said spacer within said ferrule;

each ferrule of said ferrule pair further defining an aperture for confrontation with a corresponding aperture of said adjacent ferrule of said ferrule pair to define a common aperture between said ferrule pair for receiving a spring between said ferrules, said common aperture of each ferrule defining at the sides thereof an opening sufficient to define respective first and second tab receiving slots to the exterior of said ferrule when confronted to a similar said ferrule at said tab receiving slot;

a loop spring having first and second legs, said first spring leg for biasing a fuel rod interior of said common aperture of a first ferrule of said ferrule pair and a second spring leg for biasing a fuel rod interior of said common aperture of said second ferrule of said ferrule pair, said first and second legs of said spring moveable from a first position of compression for insertion of said spring through one of said first and second tab receiving slots to a second position of expansion with respect to said first and second tab receiving slots for trapping said spring in said common aperture;

at least first and second tabs protruding from at least one of said spring legs, said first tab protruding from a first side of said spring and said second tab protruding from a second side of said spring, said tabs for maintaining said loop spring in said second position of expansion in said common aperture at said tab receiving slots; and said first and second ferrules confronted at said apertures and said main body of said loop spring being inserted in said common aperture, said tabs protruding into said tab receiving slots to maintain said loop spring in said common aperture and said rod biasing projection passing through said common aperture whereby said rod biasing projections on the respective spring legs of said loop spring can bias respective fuel rods in each said ferrule of said ferrule pair against said stops to maintain said fuel rods in designed side-by-side spacing.

2. The invention of claim 1 and wherein said spring has upper and lower tabs on each side of said spring.

3. The invention of claim 2 and wherein said common aperture has a generally rectangular shape with a varying width;

said common aperture further having a maximum width in the upper and lower portions of said aperture to allow insertion of the upper and lower tabs of said spring.

4. The invention of claim 1 and including:

a central fuel rod biasing projection slot at the middle of said common aperture allowing of a rod biasing projection on the spring to be inserted; and, wherein said spring includes at least one rod biasing portion in at least one of said spring legs of said spring.

5. The invention of claim 1 and wherein said common aperture is generally I-shaped.

6. The invention of claim 1 and wherein:

said tabs form an integral portion of said loop of said loop spring.

7. A fuel bundle comprising:

a plurality of fuel rods;

a lower tie plate for supporting said plurality of fuel rods in side-by-side upstanding relation and defining a plurality of apertures for permitting water to be heated to enter said fuel bundle;

an upper tie plate for maintaining the upper ends of said fuel rods in parallel side-by-side relation as supported on said lower tie plate and defining a plurality of apertures for permitting heated water to escape from said fuel bundle, a channel for surrounding said fuel rods and extending from said lower tie plate toward said upper tie plate for confining said water flow around said fuel rods within said fuel bundle;

a plurality spacers for placement within said channel between said tie plates around said fuel rods for maintaining said fuel rods in designed side-by-side spacing;

each spacer including at least first and second side-by-side ferrules forming a ferrule pair for fitting around respective side-by-side fuel rods to maintain said fuel rods spaced apart one from another;

each ferrule of said ferrule pair having at least one internal stop for permitting said fuel rod internal of said ferrule to be biased against said stop to a position of designed side-by-side alignment with respect to said fuel bundle at said spacer within said ferrule;

each ferrule of said ferrule pair further defining an aperture for confrontation with a corresponding aperture of said adjacent ferrule of said ferrule pair to define a common aperture between said ferrule pair for receiving a spring between said ferrules, said common aperture having sufficient dimension for defining at the sides thereof when confronted to another similar said ferrule respective first and second tab receiving slots to the exterior of said ferrules;

a loop spring having first and second legs, said first spring leg for biasing a fuel rod interior of said first ferrule of said ferrule pair and a second spring leg for biasing a fuel rod interior of said second ferrule of said ferrule pair, said legs moveable from a first position of compression for insertion of said spring through one of said first and second tab receiving slots to a second position of expansion with respect to said first and second tab receiving slots for trapping said spring in said common aperture;

at least first and second tabs protruding from at least one of said spring legs, said first tab protruding from a first side of said spring and said second tab protruding from a second side by said spring, said tabs for maintaining said loop spring in said second position of expansion in said common aperture at said tab receiving slots; and, said first and second ferrules confronted at said apertures and said main body of said loop spring being inserted in said common aperture, said tabs protruding into said tab receiving slots to maintain said loop spring in said aperture and said rod biasing projection passing through said common aperture slot whereby said rod biasing projections on the respective spring legs of said loop spring can bias respective fuel rods in each said ferrule of said ferrule pair against said stops to maintain said fuel rods in designed side-by-side spacing.

8. The invention of claim 7 and wherein said spring has upper and lower tabs.

9. The invention of claim 8 and wherein said common aperture has a generally rectangular shape with a varying width; and said common aperture further having a maximum width in the upper and lower portions of said aperture to allow insertion of the upper and lower tabs of said spring.

10. The invention of claim 7 and including;

a central fuel rod biasing projection slot at the middle of said common aperture allowing a rod biasing projection on the spring to be inserted; and, wherein said spring includes at least one rod biasing portion in at least one of said spring legs of said spring.

11. The invention of claim 7 and wherein said common aperture is generally I-shaped.

12. The invention of claim 7 and wherein:

said tabs form an integral portion of said loop of said loop spring.

13. A fuel bundle spacer for placement within a fuel bundle channel between upper and lower tie plates around fuel rods for maintaining said fuel rods in designed side-by-side spacing, said spacer comprising:

a matrix of ferrules coextensive with the construction of said spacer for placement within the fuel bundle;

said matrix including at least first and second side-by-side ferrules forming a ferrule pair for fitting around respective side-by-side fuel rods to maintain said fuel rods spaced apart one from another;

each ferrule of said ferrule pair having at least one internal stop for permitting said fuel rod internal of said ferrule to be biased against said stop to a position of designed side-by-side alignment with respect to said fuel bundle at said spacer within said ferrule;

each ferrule of said ferrule pair further defining an aperture for confrontation with a corresponding aperture of said adjacent ferrule of said ferrule pair to define a common aperture between said ferrule pair for receiving a spring between said ferrules, said common aperture of each ferrule defining at the sides thereof an opening sufficient to define respective first and second tab receiving slots to the exterior of said ferrule when confronted to a similar said ferrule at said tab receiving slot;

a loop spring having first and second legs, said first spring leg for biasing a fuel rod interior of said common aperture of a first ferrule of said ferrule pair and a second spring leg for biasing a fuel rod interior of said common aperture of said second ferrule of said ferrule pair, said legs moveable from a first position of compression for insertion of said spring through one of said first and second tab receiving slots to a second position of expansion with respect to said first and second tab receiving slots for trapping said spring in said common aperture;

at least first and second tabs protruding from at least one of said spring legs, said first tab protruding from a first side of said spring and said second tab protruding from a second side of said spring, said tabs for maintaining said loop spring in said second position of expansion in said common aperture at said tab receiving slots; and said first and second ferrules confronted at said apertures and said main body of said loop spring being inserted in said common aperture, said tabs protruding into said tab receiving slots to maintain said loop spring in said common aperture and said rod biasing projection passing through common aperture whereby said rod biasing projections on the respective spring legs of said loop spring can bias respective fuel rods in each said ferrule of said ferrule pair against said stops to maintain said fuel rods in designed side-by-side spacing.

14. The invention of claim 13 and wherein said spring has upper and lower tabs.

15. The invention of claim 14 and wherein said common aperture has a generally rectangular shape with a varying width; and
   said common aperture further having a maximum width in the upper and lower portions of said aperture to allow insertion of the upper and lower tabs of said spring.

16. The invention of claim 13 and including:
   a central fuel rod biasing projection slot at the middle of said common aperture allowing a rod biasing projection on the spring to be inserted; and,
   wherein said spring includes at least one rod biasing portion in at least one of said spring legs of said spring.

17. The invention of claim 13 and wherein said common aperture is generally I-shaped.

18. The invention of claim 13 and wherein:
   said tabs form an integral portion of said loop of said loop spring.

19. A spacer for use in combination with a fuel bundle, said fuel bundle having a plurality of fuel rods, a lower tie plate for supporting said plurality of fuel rods in side-by-side upstanding relation and defining a plurality of apertures for permitting water to be heated to enter said fuel bundle, an upper tie plate for maintaining the upper ends of said fuel rods in parallel side-by-side relation as supported on said lower tie plate and defining a plurality of apertures for permitting heated water and steam to escape from said fuel bundle, a channel for surrounding said fuel rods and extending from said lower tie plate toward said upper tie plate for confining said water flow around said fuel rods within said fuel bundle, and a plurality of spacers for placement within said channel between said tie plates around said fuel rods for maintaining said fuel rods in designed side-by-side spacing, the improvement to said spacers comprising:
   a spacer having a spacer matrix including at least first and second side-by-side ferrules forming a ferrule pair for fitting around respective side-by-side fuel rods to maintain said fuel rods spaced apart one from another;
   each ferrule of said ferrule pair having at least one internal stop for permitting said fuel rod internal of said ferrule to be biased against said stop to a position of designed side-by-side alignment with respect to said fuel bundle at said spacer within said ferrule;
   each ferrule of said ferrule pair further defining an aperture for confrontation with a corresponding aperture of said adjacent ferrule of said ferrule pair to define a common aperture between said ferrule pair for receiving a spring between said ferrules, said common aperture of each ferrule defining at the sides thereof respective first and second tab receiving slots to the exterior of said ferrules when confronted to a similar said ferrule at said common aperture;
   a loop spring having first and second legs, said first spring leg for biasing a fuel rod interior of said common aperture of said first ferrule of said ferrule pair and a second spring leg for biasing a fuel rod interior of said common aperture of said second ferrule of said ferrule pair, said first and second legs moveable from a first position of compression for insertion of said spring through one of said first and second tab receiving slots to a second position of expansion with respect to said first and second tab receiving slots for trapping said spring in said common aperture;
   at least first and second tabs protruding from at least one of said spring legs, said first tab protruding from a first side of said spring and said second tab protruding from a second side of said spring, said tabs for maintaining said loop spring in said second position of expansion in said common aperture at said tab receiving slots; and,
   said first and second ferrules confronted at said apertures and said main body of said loop spring being inserted in said common aperture, said tabs protruding into said tab receiving slots to maintain said loop spring in said aperture and said rod biasing projection passing through said common aperture slot whereby said rod biasing projections on the respective spring legs of said loop spring can bias respective fuel rods in each said ferrule of said ferrule pair against said stops to maintain said fuel rods in designed side-by-side spacing.

20. The invention of claim 19 and wherein said spring has upper and lower tabs.

21. The invention of claim 20 and wherein said common aperture has a generally rectangular shape with a varying width; and,
   said common aperture further having a maximum width in the upper and lower portions of said aperture to allow insertion of the upper and lower tabs of said spring.

22. The invention of claim 19 and including:
   a central fuel rod biasing projection slot at the middle of said common aperture allowing a rod biasing projection on the spring to be inserted; and,
   wherein said spring includes at least one rod biasing portion in at least one of said spring legs of said spring.

23. The invention of claim 19 and wherein said common aperture is generally I-shaped.

24. The invention of claim 19 and wherein:
   said tabs form an integral portion of said loop of said loop spring.

* * * * *